United States Patent [19]
Tyrell et al.

[11] Patent Number: 5,519,107
[45] Date of Patent: May 21, 1996

[54] AMINE-FUNCTIONALIZED POLYESTER

[75] Inventors: John A. Tyrell, Williamsville, N.Y.; Gary F. Smith, Evansville, Ind.

[73] Assignee: General Electric Company, Pittsfield, Mass.

[21] Appl. No.: 340,948

[22] Filed: Nov. 17, 1994

Related U.S. Application Data

[62] Division of Ser. No. 57,237, May 4, 1993, Pat. No. 5,384,387.

[51] Int. Cl.$^6$ ............................................. C08G 63/78
[52] U.S. Cl. .................. 528/275; 528/272; 528/291; 528/298; 528/300; 528/301; 528/302; 528/306; 528/307; 528/308; 528/308.6; 528/310; 528/322; 528/324; 525/437; 525/443
[58] Field of Search .................... 528/272, 275, 528/291, 298, 300, 301, 302, 306, 307, 308, 308.6, 310, 322, 324; 525/437, 443

[56] References Cited

U.S. PATENT DOCUMENTS

| | | | |
|---|---|---|---|
| 3,023,192 | 2/1962 | Shivers, Jr. | 528/300 |
| 3,493,414 | 2/1970 | Hastings | 428/151 |
| 3,886,230 | 5/1975 | Marcus | 525/444 |
| 4,264,761 | 4/1981 | McGirk | 528/300 |
| 4,355,155 | 10/1982 | Nelsen | 528/301 |
| 4,374,716 | 2/1983 | Pacifici et al. | 204/159 |
| 4,405,662 | 9/1983 | Raudenbusch et al. | 427/386 |
| 4,556,705 | 12/1985 | McCready | 528/289 |
| 4,760,112 | 7/1988 | McCready et al. | 525/33 |
| 4,839,128 | 6/1989 | Yoshino et al. | 264/328.1 |
| 4,977,294 | 12/1990 | Uphues et al. | 558/268 |
| 4,999,417 | 3/1991 | Domb | 528/271 |
| 5,134,223 | 7/1992 | Langer et al. | 528/272 |

FOREIGN PATENT DOCUMENTS 0358846  5/1989  European Pat. Off. .

*Primary Examiner*—Samuel A. Acquah

[57] ABSTRACT

Novel polyesters prepared from a diol, a dicarboxylic acid or ester forming reactive derivative thereof and an aromatic amino acid, ester or alcohol are disclosed.

14 Claims, No Drawings

AMINE-FUNCTIONALIZED POLYESTER

This is a Divisional of application Ser. No. 08/057,237 filed on May 4, 1993, now U.S. Pat. No. 5,384,387.

The present invention relates to amine functionalized polyesters. More particularly, the present invention relates to polyester resins functionalized with aromatic amines. Most particularly, the present invention relates to polyesters having free aromatic amine functionality in the polymer.

BACKGROUND OF THE PRESENT INVENTION

Polyesters, such as poly(ethylene terephthalate) or PET, and poly(butylene terephthalate) or PBT, are widely used in the preparation of articles by forming methods such as injection molding and tube extrusion. Many of their properties, including chemical stability, solvent resistance and low permeability to gases, make them attractive candidates for such forming operations as blow molding, profile extrusion and thermoforming.

Additionally, polyester resins modified with linear amines have found use in various commercial applications. For example, Marcus, U.S. Pat. No. 3,886,230, teaches that dyeable polyesters can be prepared by blending conventional polyesters with modified polyesters containing a di(hydroxyalkyl)amine polymerized in the molecule. Pacifici et al., U.S. Pat. No. 4,374,716, teach the use of polyesters prepared from glycols containing a linear tertiary amine in UV curable compositions.

However, none of the prior art references teach or suggest a polyester resin having free amine functionality in the polymer. The prior art references teach only the reaction of polyesters with linear amines which provides a polymer having amide linkages. Surprisingly, it has now been found that polyesters having free aromatic amine functionality can be provided by reacting the polyester with an aromatic amine acid, ester or alcohol.

SUMMARY OF THE PRESENT INVENTION

According to the present invention there is provided a novel aromatic amine-functionalized polyester resin comprising units derived from (a) a diol; (b) a dicarboxylic acid or an ester forming reactive derivative thereof; and (c) an aromatic amine acid, ester or alcohol. In alternative embodiments, the aromatic amine-functionalized polyester resin further comprises units derived from (d) a difunctional ether; or (e) at least one high molecular weight polyoxyalkylene diimide diacid.

Also according to the present invention there is provided a novel method for preparing the amine-functionalized polyester resins of the present invention comprising reacting (a) a diol or mixture of diols, (b) a dicarboxylic acid or an ester forming reactive derivative thereof and (c) an aromatic amino acid, ester or alcohol in the presence of a polyesterification catalyst at a temperature ranging from about 150° to about 300° C. In an alternative embodiment, the method further comprises reacting (d) a difunctional ether; or (e) at least one high molecular weight polyoxyalkylene diimide diacid.

DETAILED DESCRIPTION OF THE PRESENT INVENTION

The aromatic amine-functionalized polyesters suitable for use herein are generally those which are derived from (a) an aliphatic diol or cycloaliphatic diol, or mixtures thereof, preferably containing from 2 to about 10 carbon atoms; (b) one or more aromatic or cycloaliphatic dicarboxylic acids or ester forming reactive derivatives thereof, or mixtures thereof, preferably containing from 2 to about 10 carbon atoms; and (c) an aromatic amino acid, ester or alcohol or mixtures thereof.

Typically the diol (a) is a glycol, such as, but not limited to, tetramethylene glycol, ethylene glycol, trimethylene glycol, 2-methyl-1,3-propane glycol, decamethylene glycol, cyclohexane dimethanol, neopentylene glycol, 1,3-propylene glycol, pentaerythritol, 1,6-hexanediol, polyethylene glycol, polytetramethylene glycol, mixtures thereof and the like. Particularly useful for the practice of the present invention are tetramethylene glycol, ethylene glycol and cyclohexane dimethanol and mixtures thereof.

Typically component (b) is selected from the group of isophthalic acid, terephthalic acid, phthalic acid, 2,6-naphthalene dicarboxylic acid, 2,7-naphthalene dicarboxylic acid, 1,5-naphthalene dicarboxylic acid, 4,4'-diphenyl dicarboxylic acid, p-hydroxy benzoic acid, sebacic acid, adipic acid, azelaic acid, dodecane dicarboxylic acid and hexahydro-terephthalic acid or ester forming reactive derivatives of any of the foregoing. Particularly useful in the practice of the present invention are terephthalic acid and isophthalic acid, ester forming reactive derivatives thereof and mixtures thereof.

The ester forming reactive derivatives of carboxylic acids include equivalents of dicarboxylic acids having two functional carboxyl groups which perform substantially like dicarboxylic acids in reactions with glycols and diols in forming polyesters. These equivalents include esters and ester forming reactive derivatives such as acid halides and anhydrides.

The aromatic amino acids, esters or alcohols (c) useful in preparing the polyesters of the present invention are typically those of the general formula:

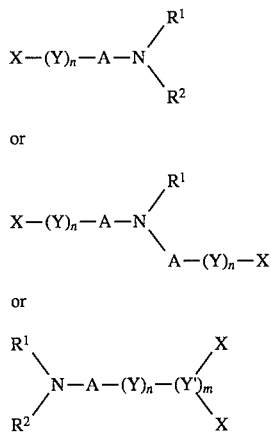

wherein A represents a mono or polycyclic aryl, $R^1$ and $R^2$ are the same or different and independently represent hydrogen, a hydrocarbon or a substituted hydrocarbon, and when taken together with the nitrogen may form a 5 to 7 membered cyclic ring; each Y is independently the same or different divalent alkylene or arylene, "n" is 0 to 20 inclusive, preferably 0 to 6, Y' is trivalent alkylene or arylene, "m" is 0 to 20 inclusive, preferably 0 to 6, and each X is the same or different and independently represent OH or $CO_2R^3$ wherein $R^3$ is hydrogen or hydrocarbon or substituted hydrocarbon.

Illustratively, $R^1$, $R^2$ and $R^3$ can independently represent hydrogen, alkyl, aryl, alkaryl, aralkyl, cycloalkyl, carboxyl, alkoxyl, hydroxyl, alkenyl, alkynyl, haloalkyl, etc.

For example, the aromatic amino acids, esters, or alcohols useful in the practice of the present invention can comprise p-aminoethyl benzoate, p-aminobenzoic acid, m-aminobenzyl alcohol, p-(N-methyl)aminoethylbenzoate, p-(N,N'-dimethyl)aminoethyl benzoate, p-(N-phenyl)aminoethylbenzoate, p-(N-piperidino)ethyl benzoate, p-(N-morpholino)ethylbenzoate, p-(N-pyridinyl)ethyl benzoate, p-aminophenylethanol, p-amino-alpha-methylbenzylalcohol, p-(N-morpholino)benzylalcohol, o-(N,N-dimethylamino)benzoic acid, p,p'-(dicarbomethoxy)diphenylamine, p,p'-(dicarboxy)diphenylamine, 1,4-aminonaphthoic acid mixtures of any of the foregoing. Particularly useful in the practice of the present invention is p-aminoethyl benzoate, p-aminobenzoic acid and mixtures thereof.

The aromatic amine-functionalized polyesters of the present invention are generally prepared by reacting a diol or mixture of diols (a), a dicarboxylic acid or an ester forming reactive derivative thereof (b) and an aromatic amino acid, ester or alcohol (c) in the presence of a catalyst. Typically, the aromatic amine-functionalized polyesters comprise the diol component (a) in amounts ranging from about 25 to about 60 percent by weight, preferably from about 35 to about 50 percent by weight; the dicarboxylic acid or ester forming reactive derivative thereof component (b) in amounts ranging from about 35 percent by weight to about 75 percent by weight, preferably from about 45 percent by weight to about 60 percent by weight; and the aromatic amine acid, ester or alcohol component (c) in amounts ranging from about 0.1 percent by weight to about 15 percent by weight, preferably from about 0.5 percent by weight to about 5 percent by weight.

In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is advantageous to render the ester-interchange catalyst ineffective following the completion of the precondensation reaction by means of known catalyst inhibitors or quenchers, in particular, phosphorus compounds such as phosphoric acid, phosphorous acid, phosphenic acid, phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony trioxide and the like. These catalysts, as well as additional useful catalysts, are described in U.S. Pat. Nos. 2,465,319; 2,850,483; 2,892,871; 2,937,160; 2,998,412; 3,047,539; 3,110,693; and 3,385,830.

Where the reactants and reactions allow, it is preferred to use titanium-containing catalysts including inorganic and organic titanium containing catalysts, such as those described in, for example, U.S. Pat. Nos. 2,720,502; 2,727,881; 2,729,619; 2,822,348; 2,906,737; 3,047,515; 3,056,817; 3,056,818; and 3,076,952 among others. Particularly useful are the organic titanates such as titanium alkyl esters, e.g., tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts, such as, for example, zinc acetate, manganese acetate or antimony trioxide, and/or with a catalyst quencher as described above.

The amount of catalyst used in the esterification reaction generally ranges from about 0.005 to about 0.4 percent by weight, based on the amount of acid or ester. In the method of preparing the polyesters of the present invention, typically the diol, dicarboxylic acid or ester forming reactive derivative thereof, aromatic amino acid, ester or alcohol and catalyst are heated to a temperature ranging from about 150° to about 300° C. to effect the esterification reaction. Such esterification conditions are well known to those of ordinary skill in the art.

Alternatively, the polyesters may further comprise units derived from an ether unit, an etherimide unit or both an ether unit and etherimide unit to provide the novel aromatic amine-functionalized copolyetheresters and aromatic amine-functionalized copolyetherimide esters, and novel aromatic amine-functionalized co(copolyetherester-copolyetherimide ester), respectively, of the present invention, respectively. It is only necessary that the aromatic amino acid, ester or alcohol component be present in an amount ranging from about 0.1 to about 15 percent by weight, preferably from about 0.5 to about 5 percent by weight.

The aromatic amine-functional copolyetheresters and copolyetherimide esters can conveniently be prepared by conventional esterification/condensation polymerization reactions, as described above for the polyesters. These processes are well known in the art and are described in the patent literature, e.g., U.S. Pat. Nos. 3,763,109, 3,651,014, 3,801,547, 4,556,705.

In the case of amine-functionalized copolyether esters, these typically comprise units derived from (d) a difunctional ether in addition to diol, dicarboxylic acid or ester forming reactive derivative thereof, and aromatic amino acid, ester or alcohol.

Generally, the difunctional polyethers (d) useful in the practice of the present invention are those having the formula:

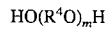

HO(R⁴O)ₘH wherein $R^4$ is one or more divalent organic radicals and m is an integer of a value to provide an ether having a molecular weight of from about 350 to about 6000. Representative difunctional polyethers which may be used include, but are not limited to, the poly(alkylene oxide)glycols, such as poly(ethylene oxide)glycol, poly(propylene oxide)glycol, poly(tetramethylene oxide)glycol, poly(pentamethylene oxide)glycol; the dicarboxymethyl acids of poly(alkylene oxides); polydioxolane and other polyformals prepared by reacting formaldehyde with other glycols; and mixtures of any of the foregoing. Some of the alkylene radicals in these polyethers may be replaced by arylene or divalent cycloaliphatic radicals.

In the case of the aromatic amine-functionalized polyetherimide esters these typically comprise units derived from (e) at least one high molecular weight polyoxyalkylene diimide diacid; in addition to the diol, dicarboxylic acid or ester forming reactive derivative thereof and aromatic amino acid, ester or alcohol components.

The amine-functionalized polyetherimide esters are typically prepared by prereacting a poly(oxyalkylene diamine) with a tricarboxylic acid to form a polyoxyalkylene diimide diacid, which can then be reacted with the diol (a), dicarboxylic acid or ester forming reactive derivative thereof (b) and aromatic amine (c) components to form the aromatic amine-functionalized copolyetherimide esters of the present invention. This method is generally described in U.S. Pat. No. 4,556,705 to McCready.

The poly(oxyalkylene)diamines suitable for use in the present invention may be represented by the following general formula:

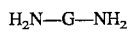

wherein G is the radical remaining after the removal of the amino groups of a long chain alkylene ether diamine. These polyether diprimary diamines are available commercially from Texaco Chemical Company under the tradename Jeffamine®. In general, they are prepared by known processes for the amination of glycols. For example, they may be prepared by aminating the glycol in the presence of ammonia, Raney nickel catalyst and hydrogen as set forth in Belgium Patent No. 634,741. Alternatively, they may be prepared by treating glycol with ammonia and hydrogen over a nickel-copper-chromium catalyst as taught by U.S. Pat. Nos. 3,155,728 and 3,236,895 and French Patent Nos. 1,551,605 and 1,466,708.

Preferred long chain ether diamines for use herein are the polymeric diamines having terminal, or as nearly terminal as possible, amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines, prepared by reacting formaldehyde with diols such as 1,4-butanediol and 1,5-pentanediol and subsequent amination are useful.

The tricarboxylic acid may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is a particularly useful tricarboxylic acid component, any number of suitable tricarboxylic acid constituents will occur to those skilled in the art, including, but not limited to 2,6,7-naphthalene tricarboxylic anhydride, 3,3',4-diphenyl tricarboxylic anhydride, 3,3',4-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anhydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

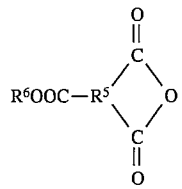

wherein:

$R^5$ is a trivalent organic radical, typically a $C_2$-$C_{20}$ aliphatic or cycloaliphatic, or $C_6$-$C_{20}$ aromatic trivalent radical;

$R^6$ is hydrogen or a monovalent organic radical, such as a $C_1$-$C_6$ aliphatic and/or cycloaliphatic radicals and $C_6$-$C_{12}$ aromatic radicals, e.g., benzyl. Particularly useful is where $R^6$ represents hydrogen.

The polyoxyalkylene diimide diacid is prepared by the imidization reaction of one or more tricarboxylic acids containing two vicinal carboxyl groups or an anhydride group and an additional carboxyl group which must be esterifiable with the high molecular weight poly(oxyalkylene)diamine. These polyoxyalkylene diimide diacids and processes for their preparation are more fully disclosed in U.S. Pat. No. 4,556,705. Briefly, these polyoxyalkylene diimide diacids may be prepared by known imidization techniques, including melt synthesis, or by synthesizing in a solvent system at the reflux temperature of the solvent or azeotropic (solvent) mixture.

The polyoxyalkylene diimide diacid (e) may be represented by the general formula:

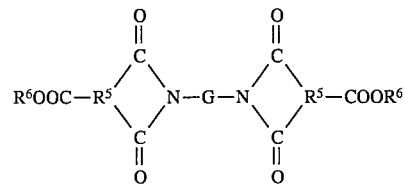

wherein G, $R^5$, and $R^6$ are as defined above. The polyoxyalkylene diimide diacids of this formula suitable for use herein are high molecular weight diimide diacids having an average molecular weight greater than about 700, preferably greater than about 900.

In reacting the polyoxyalkylene diimide diacid (e) with the diol (a), dicarboxylic acid or ester forming reactive derivative thereof (b) and aromatic amino acid, ester or alcohol (c) components, it is generally preferred that the diol be present in at least a molar equivalent amount, preferably a molar excess, most preferably at least 150 mole % based on the moles of dicarboxylic acid or ester forming reactive derivative thereof and polyoxyalkylene diimide diacid combined. Such a molar excess of diol will generally allow for increased yields, based on the amount of acids, while accounting for the loss of diol during esterification.

In this process, the amount of polyoxyalkylene diimide diacid and dicarboxylic acid or ester forming reactive derivative thereof is important in providing copolyetherimide esters exhibiting a wide range of flexural modulus and also improved solvent resistance. The amount of the polyoxyalkylene diimide diacid used in any such case is such that the weight ratio of the polyoxyalkylene diimide diacid to the dicarboxylic acid or ester forming reactive derivative thereof is from about 0.05 to 3.0:1, preferably from about 0.10 to about 2.5:1, and more preferably from about 0.20 to about 2.0:1. Within this ratio the polymers exhibit high flexural modulus and also improved organic solvent resistance. If the weight ratio maximum of 3.0 is exceeded the flexural modulus of the polymers is lowered. Also, the solvent resistance of these polymers is reduced, as explained above.

TABLE 1

| Example | 1 | 2 | 3 | 4 | 5 | 6 | 7 |
|---|---|---|---|---|---|---|---|
| Composition | | | | | | | |
| DMT[a] | 388 | 388 | 9977 | 9977 | 388 | 11713 | 11713 |
| BD[b] | 300 | 300 | 7710 | 8163 | 300 | 9035 | 9035 |
| AEB[c] | 7.3 | 15.6 | 188 | 420 | 13 | — | — |
| TOT[d] | 0.5 | 0.5 | 15 | 15 | 0.5 | 17 | 17 |
| PABA[e] | — | — | — | — | — | 117 | 59 |
| Properties | | | | | | | |
| Meg. amine[f] | 63 | 127 | 63 | 155 | — | 45 | 18 |
| MV[g] | 990 | — | — | 1720 | 250 | 3272 | 5736 |

[a] dimethyl terephthalate, grams
[b] butanediol, grams
[c] p-amino ethyl benzoate, grams
[d] tetra-2-ethyl titanate, cc
[e] p-amino benzoic acid, grams
[f] amine number
[g] melt viscosity measured using a Tinium Olsen melt indexer at 250° C., 0.042 inch orifice (ASTM method D-1238), poise It is also possible to prepolymerize the diol, the dicarboxylic acid or ester forming reactive derivative thereof and the aromatic amino acid, ester or alcohol components to form an aromatic amine-functionalized prepolyester, and then react this prepolyester with the diimide diacid.

The aromatic amine functionalized copolyetherimide esters of the present invention are generally substantially free of branching. If branching is desired, one needs only to introduce a branching agent, along with the preformed diimide diacid. The amount of branching agent generally will be less than 0.15 moles per mole of diimide diacid. Useful branching agents include trimethyl trimellitate, glycerol, trimethylol propane, trimellitic acid, trimesic acid and its esters and the like.

The aromatic amine-functionalized polyesters, copolyetheresters and copolyetherimide ester resins of the present invention can then be used as a molding resin to form a wide variety of articles. Conventional additives may be added to the molding compositions in order to impart particlular properties. The aromatic amine-functionalized resins of the present invention can also be used as a blend stock or compatibilizing agent. It is believed that the amine functionality enables the resins of the present invention to react with other polymers, resins or additives with proper functionality to provide improved physical properties.

DESCRIPTION OF THE PREFERRED EMBODIMENT

The following examples illustrate the present invention. They are not to be construed to limit the scope of the appended claims in any manner whatsoever.

EXAMPLES 1–7

Varying amounts of aromatic amine reactant, dimethyl terephthalate, butanediol and tetra-2-ethyl titanate (TOT) are charged to a stirred reactor where the temperature is increased from 150° C. to 220° C. over a period of 30 to 90 minutes. Methanol and water formed during the reaction is distilled from the reaction mixture. Pressure is then gradually reduced to about 0.20 mm Hg as the temperature is increased to 240°–250° C. for an additional 60 to 180 minutes. The resulting polymer is removed from the reactor and allowed to cool. The results, along with compositional data are set forth in Table 1 below.

From the above table, it can be seen that increased amounts of the aromatic amine acids and esters gives a polyester with amino functionality and having lower melt viscosity.

EXAMPLE 8

An amine functionalized polyethylene terepthalate is prepared by charging to a stirred reactor 357.0 g of dimethyl terephthalate, 193.8 g of ethylene glycol; 25.0 g of p-aminobenzoic acid and 0.85 cc TOT catalyst and reacting as described in Example 1.

The resulting polymer has an amine number of 91 and a melt viscosity of 1522 poise at 265° C.

EXAMPLE 9

An amine functionalized polycyclohexanedimethanol terephthalate is prepared by charging to a stirred reactor 146.5 g of dimethyl terephthalate, 184.5 g of cyclohexanedimethanol, 10.3 g of p-aminobenzoic acid and 0.41 cc TOT catalyst and reacting as described in Example 1.

The resulting polymer has an amine number of 59 and a melt viscosity of 438 poise at 315° C.

EXAMPLE 10

An amine functionalized copolyetherester is prepared by charging to a stirred tank reactor 220.0 g of dimethyl terephthalate, 117.5 g of butanediol, 40.0 g of hexanediol, 197.9 g of polytetramethylene glycol (molecular weight 2000), 26.0 g of p-aminobenzoic acid, 1.0 g TOT and 0.79 Irganox® 1330 stabilizer, and reacting as described in Example 1.

The resulting polymer has an amine number of 277.

EXAMPLE 11

An amine functionalized copolyether ester is prepared by charging to a stirred tank reactor 216.9 g of dimethyl terephthalate, 169.0 g of butanediol, 200 g of polytetramethylene glycol (molecular weight 2000), 5.0 g p-aminobenzoic acid, 0.98 cc TOT, 0.80 g Irganox® 1330 stabilizer, and reacting as described in Example 1.

The resulting polymer has an amine number of 51 and a melt viscosity of 652 poise.

EXAMPLE 12

An amine functionalized copolyetherimide ester is prepared by charging to a stirred tank reactor 290.7 g of dimethyl terephthalate, 229.2 g butanediol, 96.7 g of polyoxyalkylene diimide diacid, 5.0 g p-aminobenzoic acid and 1.0 cc TOT; and reacting as described in Example 1.

The resulting polymer has an amine number of 52 and a melt viscosity of 2304 poise.

The above-mentioned patents are hereby incorporated by reference.

Many variations of the present invention will suggest themselves to those skilled in the art in light of the above-detailed description. For example, instead of a polyester, there may be employed a copolyetherimide ester or other copolyetheresters or mixed copolyetherimide ester/copolyetherester copolymers. It is also contemplated that other aromatic amines may be employed, such as m-aminobenzyl alcohol, p-(N-methyl)aminoethylbenzoate, p-(N,N'-dimethyl)aminoethyl benzoate, p-(N-phenyl)aminoethyl-benzoate, p-(N-piperidino)ethyl benzoate, p-(N-morpholino)ethylbenzoate, p-(N-pyridinyl)ethyl benzoate, p-aminophenylethanol, p-amino-alphamethylbenzylalcohol, p-(N-morpholino)benzylalcohol, o-(N,N-dimethylamino)-benzoic acid, p,p'-(dicarbomethoxy)diphenylamine, p,p'-(dicarboxy)diphenylamine, 1,4-aminonaphthoic acid and mixtures of any of the foregoing. All such obvious modifications are within the full intended scope of the appended claims.

We claim:

1. An aromatic amine-functionalized polyester resin comprising units derived from:
   a) a diol selected from the group consisting of tetramethylene glycol, ethylene glycol, trimethylene glycol, 2-methyl-1,3-propane glycol, decamethylene glycol, cyclohexanedimethanol, neopentylene glycol, 1,3-propylene glycol, and 1,6-hexane diol;
   b) a dicarboxylic acid or ester forming reactive derivative thereof;
   c) an aromatic amino acid, ester, or alcohol; and
   d) a difunctional ether.

2. A polyester as defined in claim 1 wherein said difunctional ether (d) comprises a poly(alkylene oxide)glycol.

3. An aromatic amine-functionalized polyester resin comprising units derived from:
   a) a diol selected from the group consisting of tetramethylene glycol, ethylene glycol, trimethylene glycol, 2-methyl-1,3-propane glycol, decamethylene glycol, cyclohexanedimethanol, neopentylene glycol, 1,3-propylene glycol, and 1,6-hexane diol;
   b) a dicarboxylic acid or ester forming reactive derivative thereof;
   c) an aromatic amino acid, ester, or alcohol; and
   e) at least one high molecular weight polyoxyalkylene diimide diacid.

4. A polyester as defined in claim 3 wherein said polyoxyalkylene diimide diacid is derived from one or more polyoxyalkylene diamines and one or more tricarboxylic acid compounds containing two vicinal carboxyl groups or an anhydride group and an additional carboxyl group, and is characterized by the following formula:

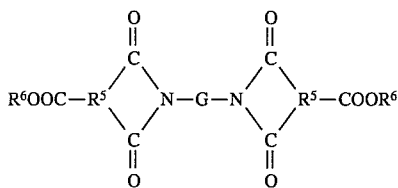

wherein each $R^5$ is the same or different and is independently selected from the group consisting of $C_2$ to $C_{20}$ aliphatic and cycloaliphatic trivalent organic radicals and $C_6$ to $C_{20}$ aromatic trivalent organic radicals; each $R^6$ is the same or different and is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the hydroxy groups of a long chain ether glycol having an average molecular weight of from about 600 to 12000.

5. The aromatic amine-functionalized polyester as defined in claim 1, further comprising units derived from:
   e) at least one high molecular weight polyoxyalkylene diimide diacid.

6. A process for the preparation of an aromatic amine-functionalized polyester comprising reacting
   a) a diol selected from the group consisting of tetramethylene glycol, ethylene glycol, trimethylene glycol, 2-methyl-1,3-propane glycol, decamethylene glycol, cyclohexanedimethanol, neopentylene glycol, 1,3-propylene glycol, and 1,6-hexane diol;
   b) a dicarboxylic acid or ester forming reactive derivative thereof;
   c) an aromatic amino acid, ester, or alcohol; and
   d) a difunctional ether,
in the presence of a polyesterification catalyst at a temperature ranging from about 150° to about 300° C.

7. The process as defined in claim 6, wherein said difunctional ether (d) comprises a polyalkylene oxide glycol.

8. A process for the preparation of an aromatic amine-functionalized polyester comprising reacting
   a) a diol selected from the group consisting of tetramethylene glycol, ethylene glycol, trimethylene glycol, 2-methyl-1,3-propane glycol, decamethylene glycol, cyclohexanedimethanol, neopentylene glycol, 1,3-propylene glycol, and 1,6-hexane diol;
   b) a dicarboxylic acid or ester forming reactive derivative thereof;
   c) an aromatic amino acid, ester, or alcohol; and
   e) at least one high molecular weight polyoxyalkylene diimide diacid.

9. A process as defined in claim 8 wherein said polyoxyalkylene diimide diacid (e) is derived from one or more polyoxyalkylene diamines and one or more tricarboxylic acid compounds containing two vicinal carboxyl groups or an anhydride group and an additional carboxyl group, and is characterized by the following formula:

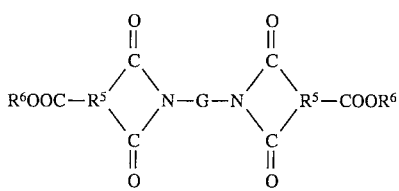

wherein each $R^5$ is the same or different and is independently selected from the group consisting of $C_2$ to $C_{20}$ aliphatic and cycloaliphatic trivalent organic radicals and $C_6$ to $C_{20}$ aromatic trivalent organic radicals; each $R^6$ is the same or different and is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the hydroxy groups of a long chain ether glycol having an average molecular weight of from about 600 to 12000.

10. The process as defined in claim 6, wherein said reaction further comprises reacting (e) at least one high molecular weight polyoxyalkylene diimide diacid.

11. A polyester resin composition consisting essentially of units derived from:
   (a) a diol or a mixture of diols;
   (b) a dicarboxylic acid or ester forming reactive derivative thereof; and
   (c) an aromatic amino acid, ester or alcohol; and, optionally,
   (d) a difunctional ether;
   (e) at least one high molecular weight polyoxyalkylene diimide diacid; or
   (f) both a difunctional ether and at least one high molecular weight polyoxyalkylene diimide diacid.

12. The amine-functionalized polyester resin of claim 1, wherein said resin has an amine number of at least 18.

13. The amine-functionalized polyester resin of claim 3, wherein said resin has an amine number of at least 18.

14. The amine-functionalized polyester resin of claim 5, wherein said resin has an amine number of at least 18.

* * * * *